US012184025B2

(12) United States Patent
Barthelmes et al.

(10) Patent No.: US 12,184,025 B2
(45) Date of Patent: Dec. 31, 2024

(54) HIGH FREQUENCY ELECTRICAL CONNECTOR ASSEMBLY

(71) Applicant: Amphenol Corporation, Wallingford, CT (US)

(72) Inventors: Owen R. Barthelmes, Putnam Valley, NY (US); Michael A. Hoyack, Sandy Hook, CT (US)

(73) Assignee: AMPHENOL CORPORATION, Wallingford, CT (US)

( * ) Notice: Subject to any disclaimer, the term of this patent is extended or adjusted under 35 U.S.C. 154(b) by 0 days.

(21) Appl. No.: 18/349,888

(22) Filed: Jul. 10, 2023

(65) Prior Publication Data

US 2023/0352859 A1 Nov. 2, 2023

Related U.S. Application Data

(63) Continuation of application No. 16/930,537, filed on Jul. 16, 2020, now Pat. No. 11,715,892, which is a (Continued)

(51) Int. Cl.
*H01R 9/05* (2006.01)
*H01R 13/6582* (2011.01)

(Continued)

(52) U.S. Cl.
CPC ......... *H01R 9/0527* (2013.01); *H01R 9/0515* (2013.01); *H01R 9/0521* (2013.01);

(Continued)

(58) Field of Classification Search
CPC .. H01R 9/0527; H01R 9/0521; H01R 9/0515; H01R 13/6582; H01R 13/6583;

(Continued)

(56) References Cited

U.S. PATENT DOCUMENTS 3,719,918 A 3/1973 Kerr
D235,343 S 6/1975 Otto (Continued)

FOREIGN PATENT DOCUMENTS

CN 103378429 A 10/2013
CN 107104320 A 8/2017

(Continued)

OTHER PUBLICATIONS

Amphenol Broadband Solutions, Coaxiel Connector Information Sheet, Type: QC II—Series 11 Universal, Ni, Quickshield, 2 pages.

(Continued)

*Primary Examiner* — Peter G Leigh
(74) *Attorney, Agent, or Firm* — CANTOR COLBURN LLP

(57) ABSTRACT

A connector assembly that includes a receptacle with inner and outer shells which have a front end for mating with a mating connector and a back end configured to connect to a printed circuit board. Receptacle primary and secondary ground connections are located on one of the shells. A plug with an outer shell that supports a pin contact to mate with the socket contact. The outer shell of the plug has a front end for mating with the front end of the receptacle and a back end that is configured to connect to a coaxial cable. Plug primary and secondary ground connections are located on the outer shell. When the receptacle and plug are mated, the primary ground connections form a primary grounding path through the assembly and the secondary ground connections form a secondary grounding path through the assembly, thereby electrically connecting the plug with the board.

20 Claims, 7 Drawing Sheets

Related U.S. Application Data continuation of application No. 16/196,893, filed on Nov. 20, 2018, now Pat. No. 10,797,412.

(60) Provisional application No. 62/589,092, filed on Nov. 21, 2017.

(51) Int. Cl.

| | |
|---|---|
| ***H01R 13/6583*** | (2011.01) |
| ***H01R 24/50*** | (2011.01) |
| ***H01R 24/54*** | (2011.01) |
| *H01R 13/6599* | (2011.01) |
| *H01R 103/00* | (2006.01) |

(52) U.S. Cl.
CPC ..... *H01R 13/6582* (2013.01); *H01R 13/6583* (2013.01); *H01R 24/50* (2013.01); *H01R 24/54* (2013.01); *H01R 13/6599* (2013.01); *H01R 2103/00* (2013.01)

(58) Field of Classification Search
CPC .... H01R 13/6599; H01R 24/50; H01R 24/54; H01R 2103/00
USPC .......................................................... 439/578
See application file for complete search history.

(56) References Cited

U.S. PATENT DOCUMENTS

| | | | | |
|---|---|---|---|---|
| D241,341 | S | 9/1976 | Oxley | |
| 3,998,515 | A | 12/1976 | Panek | |
| 4,072,386 | A | 2/1978 | Wallo | |
| 4,088,381 | A | 5/1978 | Harnett | |
| 4,295,701 | A | 10/1981 | Gunn | |
| 4,492,421 | A | 1/1985 | Ito | |
| 4,533,194 | A | 8/1985 | Boichut et al. | |
| 4,598,961 | A | 7/1986 | Cohen | |
| 4,666,231 | A | 5/1987 | Sheesley et al. | |
| 4,674,809 | A | 6/1987 | Hollyday et al. | |
| 4,697,859 | A | 10/1987 | Fisher, Jr. | |
| 4,941,846 | A | 7/1990 | Guimond et al. | |
| D312,813 | S | 12/1990 | Takizawa | |
| D313,067 | S | 12/1990 | Kotake et al. | |
| 5,011,415 | A | 4/1991 | Suzuki et al. | |
| 5,029,904 | A | 7/1991 | Hunt | |
| D331,567 | S | 12/1992 | Braga et al. | |
| 5,176,533 | A | 1/1993 | Sakurai et al. | |
| 5,217,391 | A * | 6/1993 | Fisher, Jr. | H01R 24/44 439/578 |
| D358,295 | S | 5/1995 | Moench | |
| D368,304 | S | 3/1996 | Morrison | |
| 5,547,400 | A * | 8/1996 | Wright | H01R 24/50 439/63 |
| 5,562,506 | A | 10/1996 | Wright | |
| 5,595,499 | A | 1/1997 | Zander et al. | |
| D377,969 | S | 2/1997 | Grantham | |
| 5,611,707 | A * | 3/1997 | Meynier | H01R 13/6277 439/607.09 |
| 5,645,454 | A * | 7/1997 | Kosmala | H01R 24/52 439/675 |
| D387,146 | S | 12/1997 | Morrison | |
| D407,802 | S | 4/1999 | Hatfield et al. | |
| D429,627 | S | 8/2000 | Gradwell | |
| D432,088 | S | 10/2000 | Malak | |
| D436,076 | S | 1/2001 | Montena | |
| D451,073 | S | 11/2001 | Yasuda et al. | |
| 6,623,277 | B1 * | 9/2003 | Zhu | H01R 24/50 439/63 |
| 6,663,434 | B1 | 12/2003 | Wu | |
| 6,682,368 | B2 | 1/2004 | Murr et al. | |
| 6,692,286 | B1 * | 2/2004 | De Cet | H01R 24/40 439/582 |
| 6,695,644 | B2 * | 2/2004 | Zhao | H01R 24/50 439/80 |
| 6,702,611 | B1 * | 3/2004 | Miyazaki | H01R 13/6593 439/564 |
| 6,786,757 | B2 | 9/2004 | Pocrass | |
| 6,790,083 | B1 | 9/2004 | Chen | |
| D501,649 | S | 2/2005 | Yang et al. | |
| D505,391 | S | 5/2005 | Rodrigues et al. | |
| 6,942,520 | B2 | 9/2005 | Barlian et al. | |
| D510,910 | S | 10/2005 | Chung | |
| 6,960,101 | B1 | 11/2005 | Chen | |
| 6,976,872 | B1 | 12/2005 | Wild et al. | |
| D521,930 | S | 5/2006 | Fox | |
| 7,086,867 | B2 * | 8/2006 | Nakagawa | H01R 24/42 439/63 |
| 7,204,720 | B1 * | 4/2007 | Shiu | H01R 24/38 439/668 |
| 7,281,947 | B2 | 10/2007 | Pescatore | |
| D572,197 | S | 7/2008 | Chawgo et al. | |
| D574,783 | S | 8/2008 | Chawgo et al. | |
| D577,681 | S | 9/2008 | Amidon | |
| 7,481,673 | B1 | 1/2009 | Qu et al. | |
| D600,210 | S | 9/2009 | Snyder et al. | |
| 7,604,513 | B2 | 10/2009 | Wang et al. | |
| D603,941 | S | 11/2009 | Leelaprachakul | |
| 7,651,344 | B2 | 1/2010 | Wu | |
| 7,758,370 | B1 | 7/2010 | Flaherty | |
| 7,914,344 | B2 | 3/2011 | Tin et al. | |
| 7,927,108 | B2 | 4/2011 | Gong et al. | |
| 7,972,158 | B2 | 7/2011 | Wild et al. | |
| 7,997,930 | B2 | 8/2011 | Ehret et al. | |
| D646,226 | S | 10/2011 | Purdy et al. | |
| 8,087,954 | B2 * | 1/2012 | Fuchs | H01R 13/6275 439/352 |
| 8,162,672 | B2 | 4/2012 | Huang | |
| 8,388,377 | B2 | 3/2013 | Zraik | |
| D710,488 | S | 8/2014 | Alima | |
| 8,801,459 | B2 | 8/2014 | Mrowka | |
| 8,961,224 | B2 | 2/2015 | Grek et al. | |
| D741,801 | S | 10/2015 | Davidson, Jr. | |
| D741,802 | S | 10/2015 | Davidson, Jr. | |
| D741,803 | S | 10/2015 | Davidson, Jr. | |
| D741,804 | S | 10/2015 | Davidson, Jr. | |
| D741,805 | S | 10/2015 | Davidson, Jr. | |
| D749,519 | S | 2/2016 | Su et al. | |
| 9,384,872 | B2 | 7/2016 | Wild et al. | |
| 9,461,424 | B2 | 10/2016 | Kao et al. | |
| D777,112 | S | 1/2017 | Watkins | |
| 9,559,458 | B2 | 1/2017 | Zhang et al. | |
| D779,427 | S | 2/2017 | Juds et al. | |
| 9,633,765 | B2 | 4/2017 | Natoli et al. | |
| 9,735,531 | B2 | 8/2017 | Zhu et al. | |
| 10,060,564 | B2 | 8/2018 | Minger et al. | |
| 10,069,257 | B1 | 9/2018 | Soubh et al. | |
| D878,297 | S | 3/2020 | Holloway | |
| 10,741,972 | B2 | 8/2020 | Iwamoto et al. | |
| D898,878 | S | 10/2020 | Sprenger et al. | |
| 10,797,412 | B2 | 10/2020 | Barthelmes et al. | |
| 10,826,230 | B1 | 11/2020 | Goebel et al. | |
| D947,124 | S | 3/2022 | Cao et al. | |
| D948,441 | S | 4/2022 | Takano et al. | |
| 11,539,148 | B2 | 12/2022 | Barthelmes et al. | |
| D993,182 | S | 7/2023 | Thakare et al. | |
| D1,031,948 | S | 6/2024 | Clevenger et al. | |
| 2002/0013088 | A1 | 1/2002 | Rodrigues et al. | |
| 2003/0139081 | A1 | 7/2003 | Hall et al. | |
| 2003/0178845 | A1 | 9/2003 | Islam | |
| 2004/0029433 | A1 | 2/2004 | Lee et al. | |
| 2005/0245104 | A1 * | 11/2005 | Nakagawa | H01R 24/42 439/63 |
| 2006/0160415 | A1 | 7/2006 | Pollock | |
| 2006/0199431 | A1 | 9/2006 | Paynter | |
| 2006/0216990 | A1 | 9/2006 | Montena | |
| 2009/0215315 | A1 * | 8/2009 | Cheng | H01R 13/6485 439/607.28 |
| 2010/0112855 | A1 | 5/2010 | Paynter et al. | |
| 2010/0227504 | A1 | 9/2010 | Wang et al. | |
| 2010/0297875 | A1 | 11/2010 | Purdy et al. | |
| 2011/0143603 | A1 | 6/2011 | Huang et al. | |
| 2011/0165789 | A1 | 7/2011 | Sykes | |
| 2012/0064765 | A1 | 3/2012 | Islam | |

(56) References Cited

U.S. PATENT DOCUMENTS

| | | | |
|---|---|---|---|
| 2012/0129384 | A1 | 5/2012 | Van Swearingen |
| 2013/0012063 | A1 | 1/2013 | Thomas et al. |
| 2015/0167875 | A1 | 6/2015 | Huang |
| 2015/0180142 | A1 | 6/2015 | Tremba et al. |
| 2016/0204556 | A1 | 7/2016 | Lin et al. |
| 2017/0054258 | A1 | 2/2017 | Little et al. |
| 2019/0020149 | A1 | 1/2019 | Wu et al. |
| 2019/0157778 | A1 | 5/2019 | Barthelmes et al. |
| 2020/0350711 | A1 | 11/2020 | Barthelmes et al. |
| 2020/0350712 | A1 | 11/2020 | Barthelmes et al. |
| 2021/0104828 | A1 | 4/2021 | Barthelmes et al. |
| 2021/0143564 | A1 | 5/2021 | Smith et al. |
| 2021/0265788 | A1 | 8/2021 | Smith et al. |
| 2021/0265789 | A1 | 8/2021 | Smith et al. |
| 2022/0037841 | A1 | 2/2022 | Morello et al. |
| 2022/0149544 | A1 | 5/2022 | Smith et al. |
| 2022/0255271 | A1 | 8/2022 | Smith et al. |
| 2022/0356974 | A1 | 11/2022 | Tremblay et al. |

FOREIGN PATENT DOCUMENTS

| | | | | |
|---|---|---|---|---|
| EP | 1079475 | A2 * | 2/2001 | ......... H01R 13/6593 |
| FR | 2990069 | A1 | 11/2013 | |
| WO | 2010114068 | A1 | 10/2010 | |
| WO | 2016097696 | A1 | 6/2016 | |
| WO | 2021167695 | A1 | 8/2021 | |

OTHER PUBLICATIONS

European Search Report issued in EP Application No. 18207632.3 dated Jul. 10, 2019.

Final Rejection issued in U.S. Appl. No. 16/930,532 on Dec. 16, 2020, 11 pages.

Gilbert Engineering/Corning GAF-UR-11-PL RG11 Plenum Ultrarange Compression Connector, https://www.tonercable.com/products/gaf-ur-11-pl-rg11-plenum-ultrarange-compression-connector.php., 2 pages.

https://picclick.com/Platinum-Tools-18051C-SealSmart-Compression-F-Connectors-for-381513254656.html., 6 pages.

International Search Report issued in Application No. PCT/US2020/066455 on May 12, 2021, 5 pages.

MCX Connector Series, https://www.amphenolrf.com/connectors/mcx.html, copyright 2019.

Non-Final Office Action issued in Design U.S. Appl. No. 29/724,964 on Jun. 24, 2021, 5 pages.

Non-Final Office Action issued in U.S. Appl. No. 16/196,893 on Sep. 12, 2019, 14 pages.

Non-Final Office Action issued in U.S. Appl. No. 16/871,114 on Apr. 7, 2021, 7 pages.

Non-Final Office Action issued in U.S. Appl. No. 16/930,532 on Sep. 9, 2020, 8 pages.

Non-Final Office Action issued in U.S. Appl. No. 16/930,537 on Jul. 1, 2021, 11 pages.

Non-Final Office Action issued in U.S. Appl. No. 17/129,309 on Dec. 24, 2021, 6 pages.

Non-Final Office Action issued in U.S. Appl. No. 17/129,325 on Feb. 18, 2021, 10 pages.

Office Action issued in Chinese Patent Application No. 201811393059.6 on Jun. 11, 2021, with English Translation, 18 pages.

Search Report issued in Chinese Application No. 2018113930596 on Jun. 3, 2021.

SSMB Connector Series, https://www.amphenolrf.com/connectors/ssmb.html, copyright 2019.

U.S. Appl. No. 16/930,537, filed Jul. 16, 2020; Final Office Action dated Mar. 7, 2022; 49 pages.

U.S. Appl. No. 17/122,515, filed Dec. 15, 2020; Non-Final Office Action dated Mar. 29, 2022; 25 pages.

U.S. Appl. No. 29/724,964, filed Feb. 20, 2020; Notice of Allowance dated Feb. 24, 2022; 9 pages.

Written Opinion issued in Application No. PCT/US2020/066455 on May 12, 2021, 9 pages.

U.S. Appl. No. 18/526,578; Non-Final Office Action dated Jun. 13, 2024; 22 pages.

U.S. Appl. No. 29/877,328; Notice of Allowance dated Jul. 24, 2024; 40 pages.

* cited by examiner

HIGH FREQUENCY ELECTRICAL CONNECTOR ASSEMBLY

CROSS-REFERENCE TO RELATED APPLICATIONS

This application is a continuation of U.S. patent application Ser. No. 16/930,537, filed Jul. 16, 2020, which is a continuation of U.S. patent application Ser. No. 16/196,893, filed Nov. 20, 2018, which claims priority to U.S. Provisional Application No. 62/589,092, filed on Nov. 21, 2017, the subject matter of both of which is herein incorporated by reference. This application also relates to U.S. patent application Ser. No. 10/797,412, entitled High Frequency Electrical Connector, filed concurrently herewith.

BACKGROUND

The present disclosure relates to an electrical connector and assemblies designed to improve RF performance for high frequency applications.

In current RF based systems, there is an increased need to prevent radio frequency (RF) leakage and RF ingress for all enclosures and transmission lines, including RF connectors and cables, to improve RF performance. This need is increasing because, as more RF spectrum is licensed for commercial use, there is increased opportunity for crosstalk between systems operating in the same spectrum. An example of this is broadband internet delivery networks, such as DOCSIS (Data Over Cable Service Interface Specification) 3.0 and 3.1 CATV (Cable Television) systems. These systems are typically limited to a frequency range of DC to 1200 MHz. At the same time there are new wireless spectrums licensed for mobile communications, such as LTE (Long Term Evolution), and are operating on bands within the same frequency range. For example, two conflicting spectrums used for LTE communication are 700 MHz Block C, Band 13 and 800 MHz ESMR (Enhanced Specialized Mobile Radio), Band 26. For optimal RF performance, the connector interfaces and cable transmission lines need to prevent ingress of these wireless signals into wired broadband systems.

Components of the current RF electrical connectors, such as F-type connectors, such as seen in FIG. 1, are typically mated by a threaded engagement. The F-type connector 10 shown in FIG. 1, has a threaded nut 12 and a center pin 14 extending outside of the nut 12 for mating with a contact 16 of a mating connector 18. Often, however, an installer fails to properly tighten the components when threading them together (e.g. when engaging the nut 12 with the mating connector 18), resulting in significant leakage of RF signal. Even a push-on engagement can leave gaps between the components, which allow considerable RF leakage resulting in a degraded RF performance. Also, the feed through interface of F-type connectors results in variable center pin size which limits performance at higher frequencies and data rates. The F-type connectors can also be unreliable due to bent pins and pin integrity with exposure and corrosion. And voltage micro-spikes from the signal-then-ground mating sequence often occurs in the conventional RF connectors.

SUMMARY

The present disclosure may provide a high frequency electrical connector that may comprise an outer conductive shell supporting at least one signal contact therein and that comprises a front end for mating with a mating connector and a back end opposite the front end for electrically connecting to a printed circuit board or a coaxial cable. A primary ground connection may be located inside of the outer conductive shell. A secondary ground connection separate from the primary ground connection may be located either inside or outside of the outer conductive shell. The primary and secondary grounding connections define separate grounding paths of the electrical connector. In a preferred example, the high frequency electrical connector is an RF plug or receptacle.

In certain examples, the primary ground connection is one or more inner contact points inside of the outer conductive shell that are configured to electrically engage the mating connector; the one or more inner contact points are located on one or more spring fingers of an inner conductive shell inside of the outer conductive shell, and the one or more spring fingers may be located by an interface end of the at least one signal contact; the inner conductive shell has a front end for mating with the mating connector and a back end, the back ends of the outer and inner conductive shells are configured for electrically connecting to a printed circuit board, and a receiving area is defined between the outer and inner conductive shells for accepting a mating end of the mating connector; the back ends of the outer and inner conductive shells include one or more tails for connecting to the printed circuit board; the front end of the inner conductive shell includes the one or more spring fingers, and the one or more spring fingers surround the at least one signal contact; and/or a dielectric insert is received in the inner conductive shell and surrounds the at least one signal contact.

In one example, the one or more inner contact points of the primary ground connection are on an inner surface of the outer conductive shell near or at the front end and the back end is terminated to a coaxial cable.

In another example, the at least one signal contact is set-back such that the front end of the outer conductive shell extends past an interface end of the at least one signal contact for a closed entry mating; the front end of the outer conductive shell is devoid of threads.

In some examples, the secondary ground connection is one or more contact points on an inner surface of the outer conductive shell; the one or more contact points are located on one or more spring tabs extending inwardly from the inner surface of the outer conductive shell; the secondary ground connection is one or more contact points on an outer surface of the outer conductive shell near or at the front end; and/or the one or more contact points are located in an annular recess on the outer surface.

The present disclosure may also provide an electrical connector assembly, that comprises a receptacle that may comprise inner and outer conductive shells, wherein the inner shell supports at least one socket contact therein, and each of the inner and outer conductive shells has a front end for mating with a mating connector and a back end configured to electrically connect to a printed circuit board. A receptacle primary ground connection may be located on the inner conductive shell, and a receptacle secondary ground connection may be located on an inner surface of the outer conductive shell. The assembly may also comprise a plug that may comprise an outer conductive shell supporting at least one pin contact configured to mate with the at least one socket contact of the receptacle. The outer conductive shell of the plug has a front end for mating with the front end of the receptacle, and a back end configured to electrically connect to a coaxial cable. A plug primary ground connection may be located on an inner surface of the outer conductive shell of the plug, and a plug secondary ground connection may be located on an outer surface of the outer conductive shell of the plug. When the receptacle and plug are mated, the receptacle and plug primary connections form a primary grounding path through the assembly and the receptacle and plug secondary ground connections form a secondary grounding path through the assembly separate from the primary grounding path.

In certain examples, the receptacle primary ground connection is one more inner contact points; and/or the plug primary ground connection is one or more inner contact points configured to connect with the one or more inner contact points of the receptacle primary ground connection to form the primary grounding path; and/or the one or more contact points of the receptacle primary ground connection are located on one or more spring fingers at the front end of the inner conductive shell; and/or the one or more contact points of the plug primary ground connection are located on the inner surface of the outer conductive shell of the plug near or at the front end thereof.

In other examples, the receptacle secondary ground connection is one or more inner contact points of an inner surface of the outer conductive shell of the receptacle; and/or the plug secondary ground connection is one or more outer contact points on an outer surface of the outer conductive shell of the plug configured to connection with the one or more inner contact points of the receptacle secondary ground connection; and/or the one or more inner contact points of the receptacle secondary ground connection are located on one or more spring tabs extending inwardly from the inner surface of the outer conductive shell of the receptacle; and/or the one or more outer contact points of the plug secondary ground connection are located in an annular recess near or at the front end of the outer conductive shell of the plug; and/or the one or more spring tabs of the receptacle engage the annular recess of the plug.

In an example, the at least one socket contact of the assembly has an interface end for mating with a corresponding interface end of the at least one pin contact; and the interface ends being set-back in the outer conductive shells, respectively, thereby creating a closed entry mating.

In another example, the front end of the outer conductive shell of the plug is configured to be received in the outer conductive shell of the receptacle and to push onto the front end of the inner conductive shell of the receptacle; and/or the back ends of the inner and outer conductive shells of the receptacle have tails configured to engage the printed circuit board; and/or the back end of the outer conductive shell of the plug is connected to the coaxial cable via a compression engagement.

The present disclosure may further provide a high frequency electrical connector that may comprise a conductive shell supporting at least one signal contact therein and that may comprise a front end for mating with a mating connector and a back end opposite the front end for electrically connection to either a printed circuit board and a coaxial cable; means for primary grounding to establish a primary grounding path through the connector; and means for secondary grounding to establish a secondary grounding path through the connector that is separate from the primary grounding path.

The present disclosure may yet further provide a high frequency adapter that may comprise an outer conductive shell with an inner dielectric insert supporting at least one signal contact therein and comprising a front end for mating with a mating connector and a back end opposite the front end configured to engage an adapter coupling for termination to either a printed circuit board or a coaxial cable. The at least one signal has an interface end for mating with a mating contact and an opposite end received in the adapter coupling for electrically connecting to either the printed circuit board or the coaxial cable. A primary ground connection may be located inside of the outer conductive shell. A secondary ground connection separate from the primary ground connection may be located either inside or outside of the outer conductive shell. The primary and secondary ground connections define separate grounding paths of the adapter.

In certain example, the adapter coupling includes a nut portion, outer threads, and an insulator for supporting the opposite end of the at least one signal contact; the primary ground connection of the adapter may be one or more inner contact points inside of the outer conductive shell that are configured to electrically engage the mating connector; the one or more inner contact points are located on one or more spring fingers of an inner conductive shell inside of the outer conductive shell, the one or more spring fingers being located by the interface end of the at least one signal contact; and/or the one or more inner contact points are located on an inner surface of the outer conductive shell.

In some examples, the secondary ground connection of the adapter is either one or more inner contact points on an inner surface of the outer conductive shell or one or more outer contact points on an outer surface of the outer conductive shell; the second ground connection is the one or more inner contact points located on spring tabs extending inwardly from the inner surface of the outer conductive shell; and/or the second ground connection is the one or more outer contact points located in an annular recess of the outer surface of the outer conductive shell near or at the front end thereof.

In an example, the at least one signal contact of the adapter is set-back such that the front end of the outer conductive shell extends past the interface end of the at least one signal contact for a closed entry mating.

The present disclosure may further provide an electrical connector assembly that comprises a receptacle that includes inner and outer shells, the inner shell supports at least one socket contact therein, and each of the inner and outer shells has a front end for mating with a mating connector and a back end configured to connect to a printed circuit board. A receptacle primary ground connection is located on one of the inner and outer shells and a receptacle secondary ground connection is located on one of the inner and outer shells. A plug that includes an outer shell that supports at least one pin contact configured to mate with the at least one socket contact of the receptacle. The outer shell of the plug has a front end for mating with the front end of the receptacle and a back end that is configured to connect to a coaxial cable. A plug primary ground connection is located on the outer shell of the plug and a plug secondary ground connection is located on the outer shell of the plug. When the receptacle and plug are mated, the receptacle and plug primary ground connections form a primary grounding path through the assembly and the receptacle and plug secondary ground connections form a secondary grounding path through the assembly, thereby electrically connecting the plug with the printed circuit board.

In certain examples, each of the shells is conductive, each of the primary and secondary ground connections is one or more contact points on the outer or inner shell of the receptacle and one or more contact points on the outer shell of the plug; the primary and secondary ground connections of the receptacle and plug, respectively, define separate grounding paths through the electrical connector assembly to the printed circuit board; one of the primary and secondary ground connections of each of the receptacle and plug provides a mechanical connection configured to mechanically engage the front ends of the receptacle and plug; and/or the mechanical connection is corresponding snap engagement members on the receptacle and the plug.

The present disclosure may also provide an electrical connector assembly that comprises a receptacle that includes inner and outer conductive shells, the inner conductive shell supports at least one socket contact therein, and each of the inner and outer conductive shells has a front end for mating with a mating connector and a back end configured to electrically connect to a printed circuit board. The receptacle includes a receptacle primary ground connection and a receptacle secondary ground connection. A plug includes an outer conductive shell that supports at least one pin contact configured to mate with the at least one socket contact of the receptacle, the outer conductive shell of the plug having a front end for mating with the front end of the receptacle, and a back end configured to electrically connect to a coaxial cable, and the plug including a plug primary connection and a plug secondary ground connection. When the receptacle and plug are mated, the receptacle and plug primary ground connections form a primary grounding path through the assembly and the receptacle and plug secondary ground connections form a secondary grounding path through the assembly, thereby electrically connecting the plug and the printed circuit board.

In some examples, each of the primary and secondary ground connections is one or more contact points on the outer or inner conductive shell of the receptacle and one or more contact points on the outer conductive shell of the plug; and/or the primary and secondary ground connections of the receptacle and plug, respectively, define separate grounding paths through the electrical connector assembly to the printed circuit board.

The present disclosure may also provide an electrical connector assembly that comprises a receptacle that includes an outer shell, the outer shell supports at least one socket contact therein, and the outer shell has a front end for mating with a mating connector and a back end configured to electrically connect to a printed circuit board. The receptacle includes one or more receptacle ground connections. The plug includes an outer shell supports at least one pin contact configured to mate with the at least one socket contact of the receptacle, the outer shell of the plug has a front end for mating with the front end of the receptacle, and a back end configured to electrically connect to a coaxial cable. The plug includes one or more plug ground connections. When the receptacle and plug are mated, the receptacle and plug ground connections form one or more grounding paths through the electrical connector assembly, thereby electrically connecting the plug to the printed circuit board. And one of the receptacle ground connections with one of the plug ground connections are configured to mechanically engage the front ends of the receptacle and plug with one another.

In some embodiments. the mechanical connection is corresponding snap engagement members on the receptacle and the plug, respectively; the mechanical connection is corresponding engagement members on the outer shells; each of the outer shells is conductive; each of the primary and secondary ground connections is one or more contact points; one of the grounding paths formed when the receptacle and plug are mated extends is through the outer shells; and/or the receptacle has an inner conductive shell received inside of the outer shell, and the inner conductive shell supports the at least one socket contact.

In other embodiments, the outer shell of the receptacle is devoid of threads; the outer shell of the plug is devoid of threads; the mechanical connection comprises a resilient member; and/or the resilient member is a tab.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figures 1, 2:
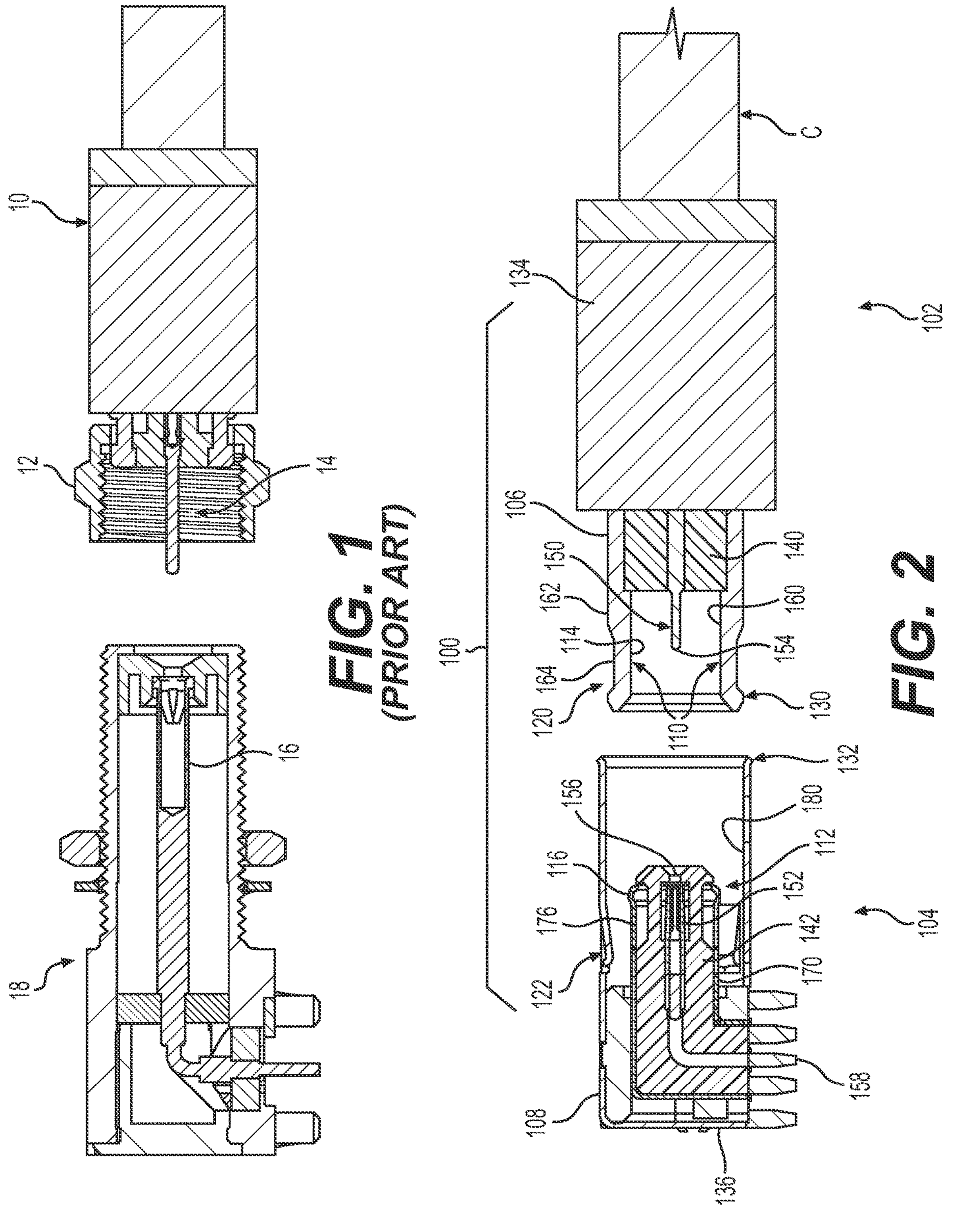
FIG. 1 (PRIOR ART)
FIG. 1 is an exploded view of a conventional F-type electrical connector.
FIG. 2 is an exploded cross-sectional view of electrical connectors and assembly thereof according to an exemplary example of the present disclosure.

Referring to the figures, the present disclosure relates to exemplary examples of electrical connectors and the assembly thereof that are designed to significantly improve RF performance, such as for high frequency applications, e.g. up to 18 GHz. The present disclosure may be, for example, RF connectors and assemblies for CATV broadband applications configured to provide an intuitive user experience suitable for consumer level usage; enable bandwidth expansion for future systems and protocols, including convergence with 5G; deliver compatibility with existing tooling infrastructure at the installer level; reduce total cost of ownership across the value chain, especially reduced truck rolls; and/or achieve high RF ingress protection against current and future wireless bands.

The electrical connectors and assembly thereof of the present disclosure may (1) incorporate a push-on interface which simplifies mating to eliminate or reduce connectivity issues during self-installation applications; (2) provide higher density packaging potential by removing wrench clearance needs between connectors; (3) incorporate a pinned interface, i.e. there is a dedicated center contact or signal pin in the interface of the plug side of the connector eliminating the need to feed the cable center conductor through to the interface to become the center contact of the plug, for consistent RF impedance and therefore performance headroom for higher frequencies (up to 18 GHz) and for high reliability contact integrity and dependable extended field life; and/or (4) provide a robust scoop-proof interface configured such that when a mating connector is partially mated and then angled in any non-coaxial position, it is not possible to "scoop" with the mating interface and make contact with or damage any internal components thereof, such as the outer contact, insulator, or center contact. The scoop-proof configuration may be achieved, for example, by recessing the contact members in the outer ground/shroud.

The electrical connectors and assembly thereof of the present disclosure may also have a configuration that allows for full sheet metal construction for long term cost benefit such as by eliminating the need to manufacture threads; provides standard compression crimp termination and existing tools; and/or leverages field proven interface technology from latest generation CMTS routers, such as blind mate connections between printed circuit boards to achieve robust mechanical and electrical performance for the connector system.

The present disclosure generally provides electrical connectors 102 and 104 and the assembly 100 thereof, which are designed to significantly suppress RF leakage and ingress at the interface of the assembled connectors, by providing a primary ground connection 110 and 112, respectively for each connector. A secondary ground connection 120 and 122, respectively, may also be provided for each connector for further improved RF performance.

Figure 3A:
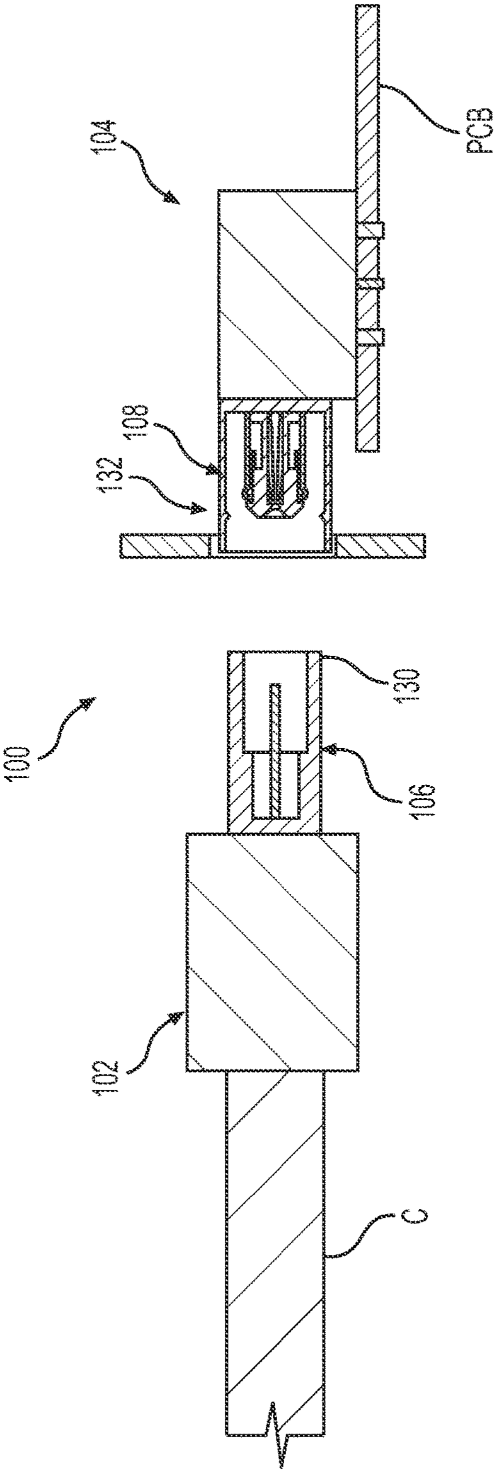
FIGS. 3A and 3B are exploded cross-sectional views of the electrical connectors and assembly illustrated in FIG. 2, showing two different mounts.
Figure 3B:
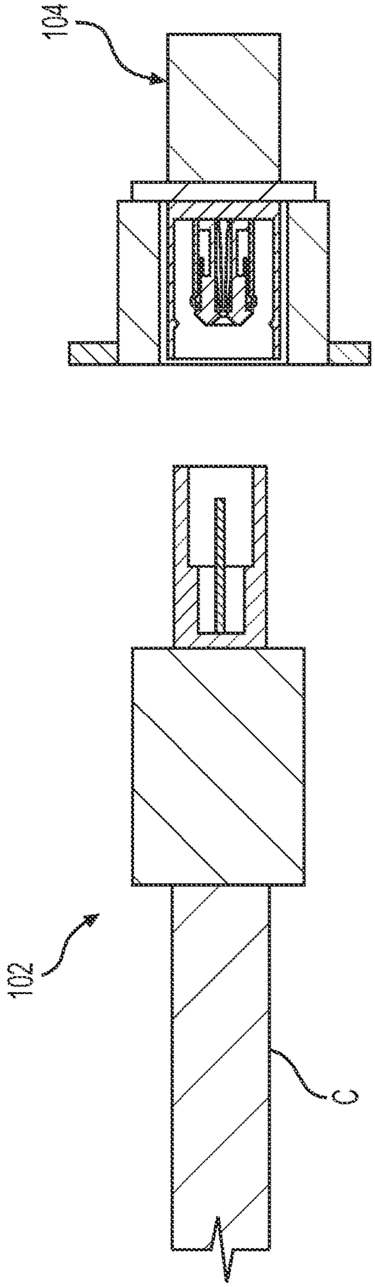

The connectors 102 and 104, may be, for example, a plug and receptacle. Each of the plug and receptacle generally has an outer conductive shell 106 and 108, respectively, a dielectric insert 140 and 142, respectively, inside the shell, that supports at least one signal contact, such as a pin 150 or a socket 152, respectively. Each outer shell 106 and 108 may comprise a front end 130 and 132, respectively, for mating with the other mating connector and a back end 134 and 136, opposite the front end. The back end 134 of the plug 102 is configured to terminate and electrically connect to a coaxial cable C, as seen in FIGS. 3A and 3B. Pin contact 150 has an interface end 154 for mating with the corresponding interface end 156 of the receptacle. The end of pin 150 opposite the interface end 154 is electrically connected to the cable C. The back end 136 of the receptacle 104 is configured to electrically connect to a printed circuit board PCB, in a right-hand configuration (FIG. 3A) or a straight configuration (FIG. 3B). Likewise, the end 158 of the socket contact 152 opposite its interface end 156 is electrically connected to the printed circuit board PCB.

As seen in FIG. 2, the outer shell 106 of plug 102 includes inner and outer conductive surfaces 160 and 162 and an annular recess 164 near or at the front end 130 of the shell 106. The dielectric insert 140 is received inside of the shell 106 an supports the pin contact 150. Pin contact 150 may be supported in a set-back position. That is, the front end 130 of the shell 106 extends past the interface end 154 of the pin contact 150 to allow for closed entry mating with the receptacle. The front end 130 of plug 106 may be designed for push-on type engagement with receptacle 104, such that no threads or threaded engagement are needed. The back end 134 may terminate the cable C via a compression engagement, such as crimping.

Figure 4:
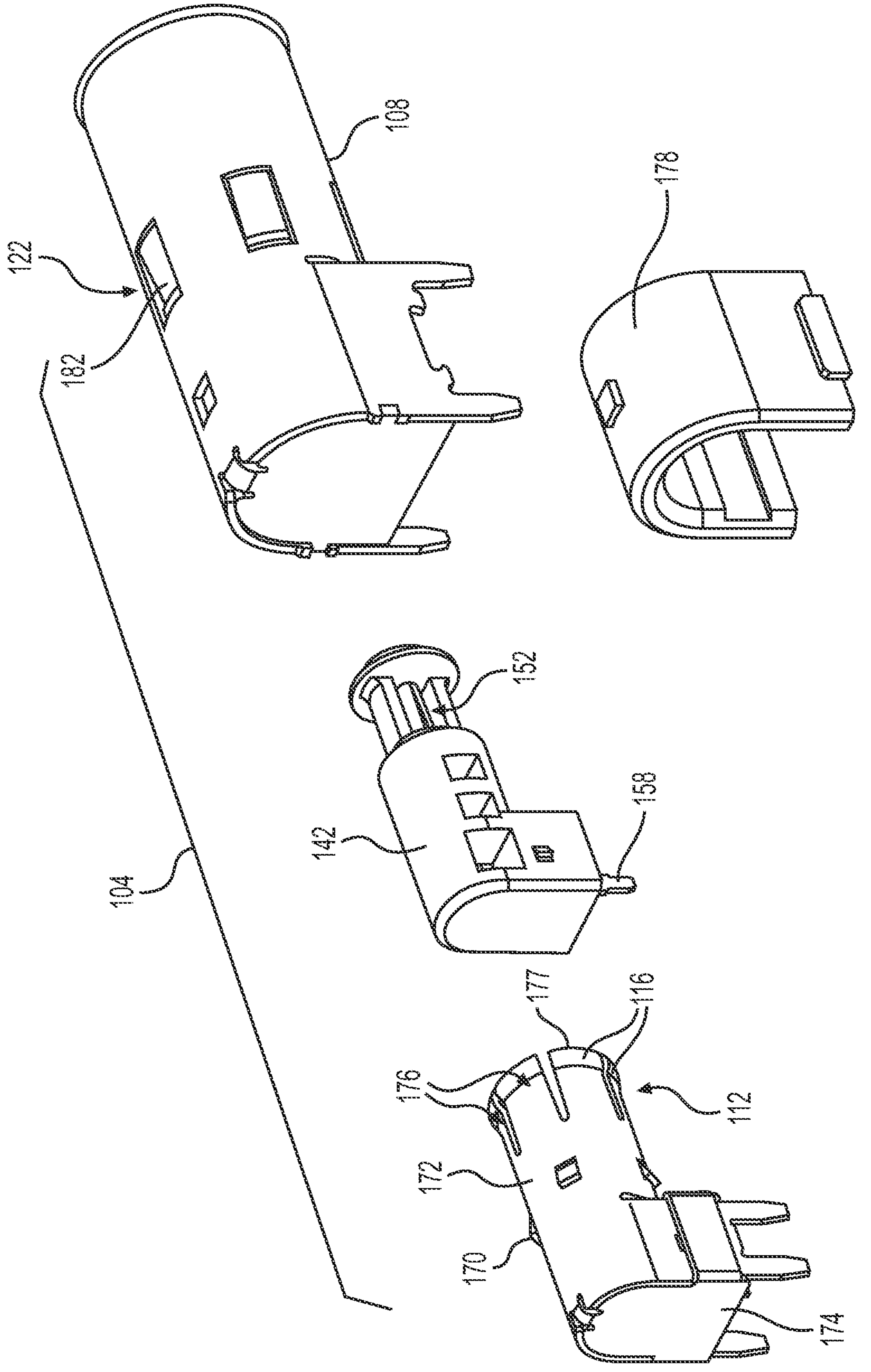
FIG. 4 is an exploded perspective view of one of the electrical connectors illustrated in FIG. 2.
Figure 5:
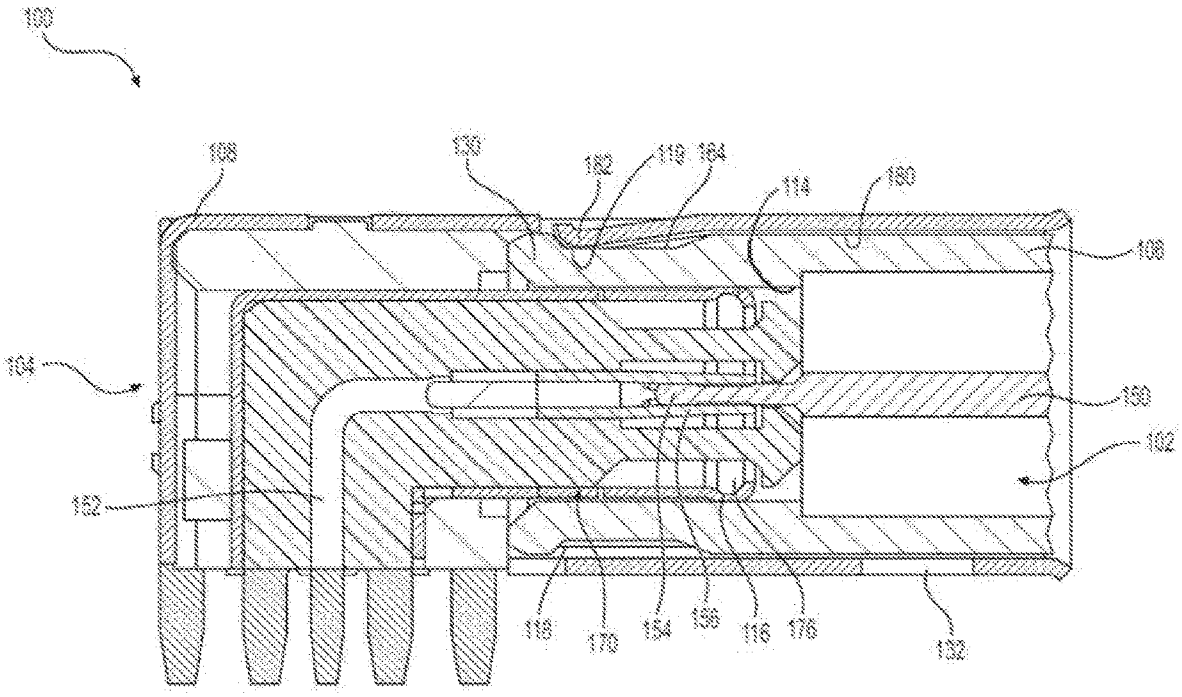
FIG. 5 is a cross-sectional view of the electrical connector illustrated in FIG. 4.

As seen in FIGS. 4 and 5, receptacle 104 may include an inner conductive shell 170 that is received inside of the outer conductive shell 108, with the dielectric insert 142 supporting the socket contact 152 therein. In an example, the dielectric insert 142 is molded around socket contact 152. Socket contact 152 may be supported in a set-back position, similar to pin contact 150. That is, outer shell 108 may extend past the interface end 156 of socket contact 152, as seen in FIG. 2. Inner shell 170 has a front end 172 for mating with the front end 130 of plug 102 and a back end 174 for electrically engaging the printed circuit board PCB. Front end 172 may include one or more spring fingers 176 by or generally surrounding the interface end 156 of socket contact 152. A lip 177 may be provided at the distal ends of the fingers 176. Both the back end 136 of the outer shell 108 and the back end 174 of inner shell 170 may have one or more tails for engaging the printed circuit board 12, such as by solder or press-fit. The space between the inner surface 180 of the outer shell 108 and the inner shell 170 is a receiving area sized to accommodate the front end 130 of plug 102. A secondary dielectric insert 178 may be provided between the outer shell 108 and the inner shell 170 near their back ends to provide additional support to the receptacle.

The primary ground connections 110 and 112 may be any grounding technique, such as grounding through the conductive surface of the shells 106 or 108 of the connectors, grounding through added ground contacts isolated and connected to the equipment PCB, or grounding through a traditional single ground, and the like. In one example, each of the primary ground connections 110 and 112 is one or more inner contact points 114 and 116, respectively, inside of the outer shells 106 and 108. The primary ground connections 110 and 112 according to the present disclosure provide a connection to ensure the RF signal is passed through the connectors, plug 102 and jack 104, with minimal signal loss.

As seen in FIGS. 2 and 5, the inner contact points 114 of the plug's primary ground connection 110 may be located on the inner surface 160 of its outer shell 106 near or at the front end 130 thereof and positioned to engage the inner contact points 116 of the receptacle's primary ground connection 112. The inner contact points 116 of receptacle 104 may be located on inner conductive shell 170 and preferably positioned on the spring fingers 176, such as the outer surfaces of lip 177 (FIG. 4), at the front end 172 of the shell 170. Alternatively, the inner contact points 114 and 116 may be positioned or incorporated into one or more arms, tines, petals, beams, or the like.

Secondary ground connection 120 and 122 of plug 102 and receptacle 104, respectively, is configured to provide additional grounding at the interface of the connector assembly. The function of the secondary ground connection 120 and 122 according to the present disclosure is to provide a secondary barrier to significantly reduce the power level of the RF signal that leaks out of, or the RF noise that leaks into, the transmission line between the connectors. The secondary ground connections 120 and 122 reduce the leakage or the power level of the leakage to a point that is less than the sensitively of the system where it is used.

Like the primary ground connection, secondary ground connection 120 and 122 of plug 102 and receptacle 104, respectively, may any grounding technique, such as grounding through the conductive surface of the shells 106 or 108 of the connectors, grounding through added ground contacts isolated and connected to the equipment PCB, or grounding through a traditional single ground, and the like. For example, the plug's secondary ground connection 120 may be one or more outer contact points 118 located on the outer surface 162 of the outer shell 106 that connect with one or more inner contact points 119 of the receptacle's ground connection 122, as seen in FIGS. 2 and 5. In an example, the outer contact points 118 of plug 102 may be positioned in the annular recess 164 of shell 106. The inner contact points 119 of receptacle 104 may be positioned on the inner surface 180 of the shell 108. In an example, the inner contact points 119 may be positioned on spring tabs 182 extending inwardly from the shell's inner surface 180. Alternatively, the outer contact points 118 and the inner contact points 119 may be positioned on or incorporated into one or more arms, tines, petals, beams, or the like.

FIG. 5 illustrates a cross-sectional view of the assembly 100 of plug 102 and receptacle 104, showing the contact points 114 and 116 of the primary ground connections electrically connected to form a grounding path and the contact points 118 and 119 of the secondary ground connections electrically connected to form another separate grounding path. The front end 130 of plug 102 may be inserted into the front end 132 of receptacle 104 and then pushed onto the receptacle's inner shell 170. Internal grounding for the assembly is provided by primary ground connections 110 and 112 through the contact of the plug's inner contact points 114 on the shell's inner surface 160 with the inner contact points 116 on the spring fingers 176 of receptacle 104, thereby defining the primary grounding path through the connectors and the assembly 100. This pinned mating interface between plug 102 and receptacle 104 provides consistent RF impedance and therefore performance headroom for higher frequencies (up to 18 GHz).

Grounding is also provided by the secondary ground connections 120 and 122 through contact of the outer contact points 118 in the annular recess 164 of the plug 102 with the inner contact points 119 on the inner spring tabs 182 of receptacle's shell 108 when the tabs 182 rest in the annular recess 164. The engagement between the plug's annular recess 164 and the receptacle's spring tabs 182 also provides a mechanical connection between plug 102 and receptacle 104 The added secondary grounding point provided by secondary grounding mechanism 120 may suppress RF leakage of the connector assembly 100 to achieve better than −100 dB even at high frequencies, e.g. −129.89 dB (for 1.2 GHz), −123.24 dB (for 3 GHz), and −117.47 dB (for 6 GHz).

Figure 6:
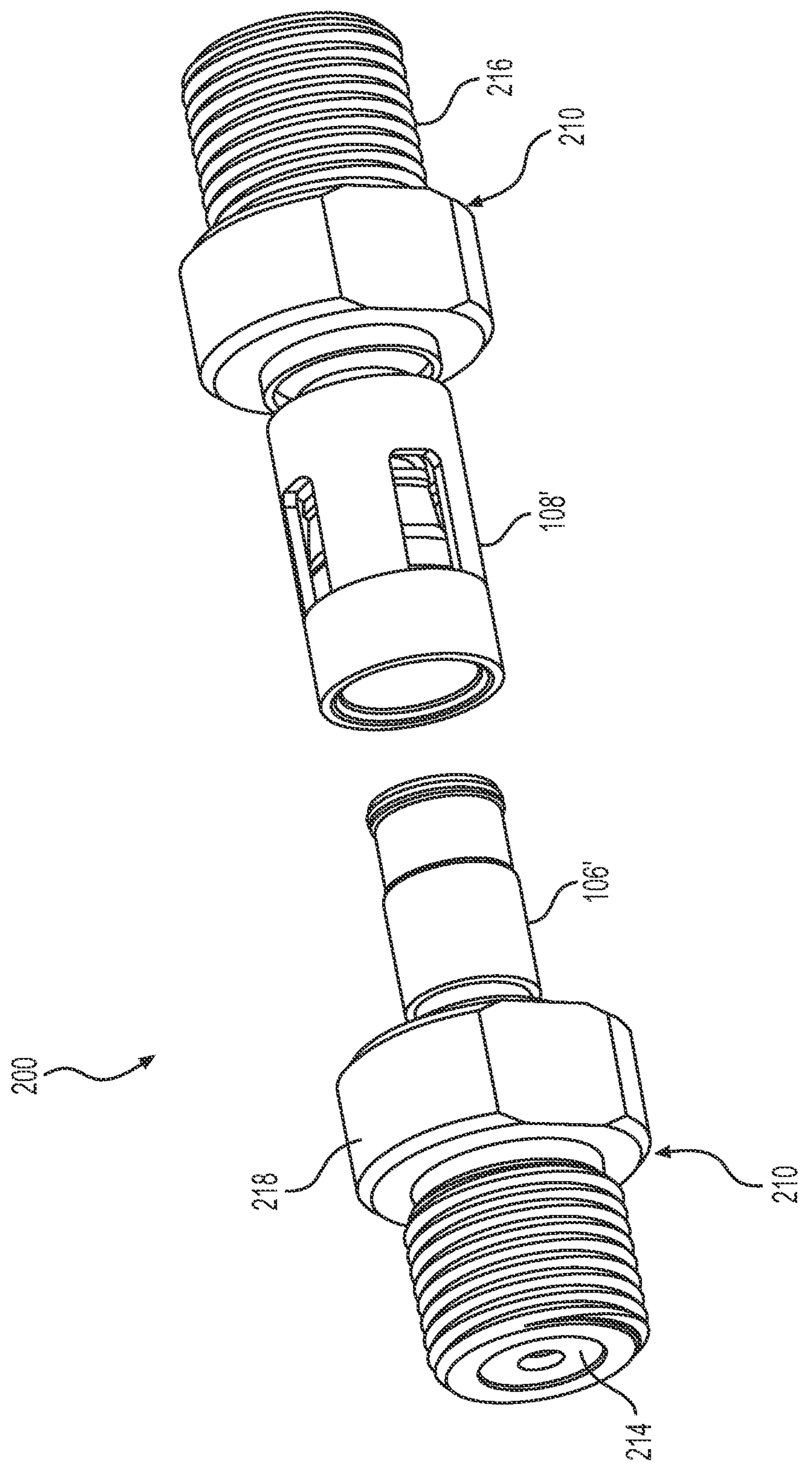
FIG. 6 is an exploded perspective view of electrical connectors and assembly thereof according to another exemplary example of the present disclosure.
Figure 7:
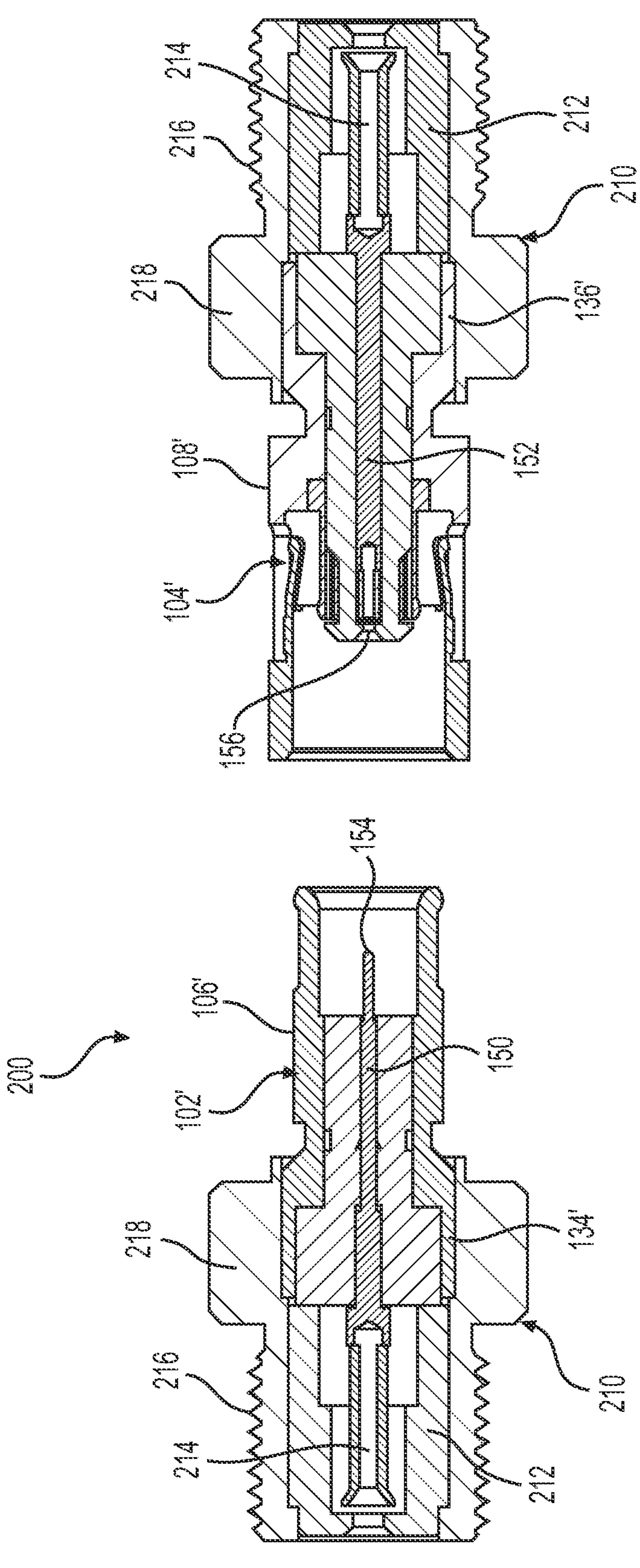
FIG. 7 is an exploded cross-sectional view of the electrical connectors and assembly illustrated in FIG. 6.
Figure 8:
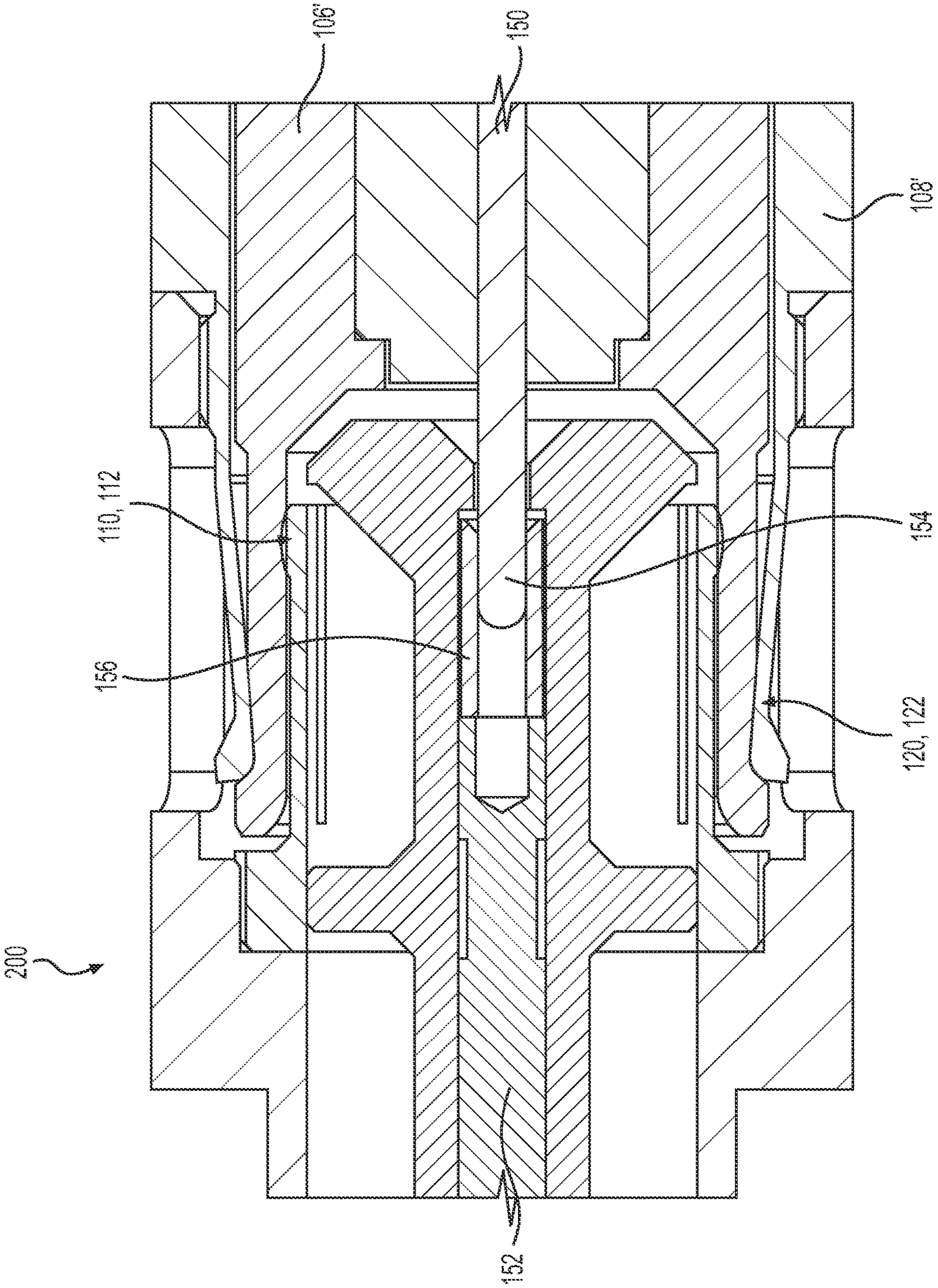
FIG. 8 is a partial cross-sectional view of the assembly of the electrical connectors illustrated in FIG. 6.

As seen in FIGS. 6-8, the present disclosure may also provide an adapter or adapter assembly 200 designed to allow the present disclosure to be used with conventional RF connection systems. The adapter comprises an adapter coupling 210 incorporated into one or both of a plug 102' and receptacle 104', which are similar to the plug 102 and receptacle 104 described in the example above. The adapter coupling 210 may be installed onto the back ends 134' and 136' of the connector shells 106' and 108', as seen in FIG. 7. Adapter coupling 210 has an inner insulator 212 that supports a contact extension 214 connected to the pin contact 150 and the socket contact 152, respectively. The contact extensions 214 may engage the ends of the pin and socket contacts 150 and 152 opposite their interface ends 154 and 156. The outer surface 216 of the adapter coupling 210 is threaded to accept a conventional connector or terminate a cable. A nut portion 218 may also be provided with adapter coupling 210 to assist with torque application. As seen in FIG. 8, the connection interface between the plug and receptacle with the adaptor coupling 210 incorporated therein is the same as described in the example above, including primary ground connections 110 and 112 and secondary ground connections 120 and 122.

In the examples of the present disclosure, the connectors may be round/tubular coaxial connectors and the ground features can be non-round shapes, such as square and still take advantage of the dual grounding shielding benefits. The secondary ground connection can be a directly integrated metal conductive component, or positioned as an independent shield component isolated from the primary ground by a dielectric material, such as air or plastic.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

It is noted that the description and claims may use geometric or relational terms, such as right, left, above, below, upper, lower, top, bottom, linear, arcuate, elongated, parallel, perpendicular, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. An electrical connector assembly, comprising:

a receptacle including an inner shell and an outer shell, the inner shell supporting at least one socket contact therein, each of the inner shell and the outer shell having a front end and a back end, and a primary inner receptacle ground contact point is located at a lip on a spring finger of the inner shell of the receptacle; and a plug including an outer shell supporting at least one pin contact configured to mate with the at least one socket contact of the receptacle, the outer shell of the plug having a front end for mating with a front end of the receptacle defined by the front ends of the inner and outer shells, a back end configured to connect to a coaxial cable, and a primary inner plug ground contact point is located on an inner surface of the outer shell of the plug, wherein the primary inner plug ground contact point and the primary inner receptacle ground contact point are electrically connected to one another when connecting together the plug and the receptacle and form a primary signal path through the assembly.

2. The electrical connector assembly of claim 1, wherein the receptacle further comprises a secondary inner receptacle ground contact point located on an inner surface of the outer shell and defined on a tab of the outer shell of the receptacle, and the plug further comprises a secondary outer plug ground contact point located on an outer surface of the outer shell, wherein the secondary outer plug ground contact point and the secondary inner receptacle ground contact point are electrically connected to one another and form a secondary signal path through the assembly when the plug and the receptacle are connected together.

3. The electrical connector assembly of claim 2, wherein the tab of the outer shell of the receptacle is configured to engage with an annular recess formed in the outer surface of the outer shell of the plug.

4. The electrical connector assembly of claim 2, wherein the primary inner plug ground contact point is included in a primary ground connection of the plug, the primary inner receptacle ground contact point is included in a primary ground connection of the receptacle, the secondary outer plug ground contact point is included in a secondary outer ground connection of the plug, and the secondary inner receptacle ground contact point is included in a secondary ground connection of the receptacle.

5. The electrical connector assembly of claim 4, wherein the primary and secondary ground connections of the receptacle and the plug, respectively, define separate grounding paths through the electrical connector assembly to a printed circuit board.

6. The electrical connector assembly of claim 4, wherein one of the primary and secondary ground connections of each of the receptacle and the plug provides a mechanical connection configured to mechanically engage the front ends of the receptacle and the plug.

7. The electrical connector assembly of claim 6, wherein the mechanical connection comprises corresponding snap engagement members on the receptacle and the plug.

8. A receptacle configured to mate with a plug, the receptacle comprising:

an outer shell having a first front end and a first back end;

an inner shell supporting at least one socket contact therein, the inner shell having a second front end and a second back end; and a primary inner receptacle ground contact point located at a lip on a spring finger of the inner shell, the primary inner receptacle ground contact point configured to establish electrical connection with a primary inner plug ground contact point included on the plug to form a primary signal path through the receptacle and the plug.

9. The receptacle of claim 8, further comprising a secondary inner receptacle ground contact point located on an inner surface of the outer shell and defined on a tab of the outer shell, the secondary inner receptacle ground contact point configured to establish electrical connection with a secondary outer plug ground contact point included on the plug to form a secondary signal path through the receptacle and the plug.

10. The receptacle of claim 9, wherein the primary inner plug ground contact point is included in a primary ground connection of the plug, the primary inner receptacle ground contact point is included in a primary ground connection of the receptacle, the secondary outer plug ground contact point is included in a secondary ground connection of the plug, and the secondary inner receptacle ground contact point is included in a secondary ground connection of the receptacle.

11. The receptacle of claim 10, wherein the primary signal path and the secondary signal path are separate grounding paths configured to electrically connect to a printed circuit board.

12. The receptacle of claim 10, wherein one of the primary ground connection and the secondary ground connection is configured to establish a mechanical connection that engages the front ends of the receptacle and a front end of the plug.

13. The receptacle of claim 12, wherein the mechanical connection includes a snap engagement member.

14. The receptacle of claim 8, wherein each of the inner and outer shells is conductive.

15. A plug configured to mate with a receptacle, the plug comprising:

an outer shell supporting at least one pin contact configured to mate with at least one socket contact of the receptacle, the outer shell having a smooth inner surface and an outer surface having an annular recess;

a front end formed by the outer shell and configured to mate with a front end of the receptacle;

a back end formed by the outer shell and configured to connect to a coaxial cable; and a primary inner plug ground contact point located on the inner surface of the outer shell, the primary inner plug ground contact point configured to establish electrical connection with a primary inner receptacle ground contact point included on the receptacle to form a primary signal path through the plug and the receptacle when mated together.

16. The plug of claim 15, further comprising a secondary outer plug ground contact point located at the annular recess of the outer surface of the outer shell, the secondary outer plug ground contact point configured to establish electrical connection with a secondary inner receptacle ground contact point included on the receptacle to form a secondary signal path through the plug and the receptacle when mated together.

17. The plug of claim 15, wherein the primary inner plug ground contact point is included in a primary ground connection of the plug, the primary inner receptacle ground contact point is included in a primary ground connection of the receptacle, the secondary outer plug ground contact point is included in a secondary ground connection of the plug, and the secondary inner receptacle ground contact point is included in a secondary ground connection of the receptacle.

18. The plug of claim 17, wherein the primary signal path and the secondary signal path are separate grounding paths configured to electrically connect to a printed circuit board.

19. The plug of claim 17, wherein one of the primary ground connection and the secondary ground connection is configured to establish a mechanical connection that mechanically engages the front end of the plug and the front end of the receptacle.

20. The plug of claim 19, wherein the mechanical connection includes a snap engagement member.

* * * * *